(12) United States Patent
Nagahara et al.

(10) Patent No.: US 6,601,431 B2
(45) Date of Patent: Aug. 5, 2003

(54) ACCELERATION SENSOR

(75) Inventors: Teruaki Nagahara, Tokyo (JP);
Yoshikazu Kaido, Tokyo (JP)

(73) Assignees: Mitsubishi Denki Kabushiki Kaisha,
Tokyo (JP); **Mitsubishi Electric
Engineering Company Limited**, Tokyo
(JP)

( * ) Notice: Subject to any disclaimer, the term of this patent is extended or adjusted under 35 U.S.C. 154(b) by 24 days.

(21) Appl. No.: 09/962,310

(22) Filed: Sep. 26, 2001

(65) Prior Publication Data

US 2002/0148291 A1 Oct. 17, 2002

(30) Foreign Application Priority Data

Apr. 16, 2001 (JP) ........................................ 2001-116781

(51) Int. Cl.$^7$ ............................................. G01P 15/125
(52) U.S. Cl. ...................................... 73/1.38; 73/514.32
(58) Field of Search ................................. 73/1.38, 1.39, 73/514.32, 514.18; 280/735

(56) References Cited

U.S. PATENT DOCUMENTS 6,257,061 B1 * 7/2001 Nonoyama et al. ...... 73/514.32

* cited by examiner

*Primary Examiner*—John E. Chapman
(74) *Attorney, Agent, or Firm*—Oblon, Spivak, McClelland, Maier & Neustadt, P.C.

(57) ABSTRACT

An acceleration sensor which can improve precision during self-diagnosis operation. The acceleration sensor includes an amplifier circuit which amplifies a detection signal obtained by converting changes in capacitance between a movable electrode and a self-diagnosis electrode into an electric signal to output the amplified signal as a self-diagnosis signal. The amplifier factor of the amplifier circuit during self-diagnosis operation is controlled to be greater than the factor during non-self-diagnosis operation.

3 Claims, 4 Drawing Sheets

ACCELERATION SENSOR

BACKGROUND OF THE INVENTION

1. Field of the Invention

The present invention relates to a semiconductor acceleration sensor that is used in airbag systems, anti-lock braking systems (ABS), and navigation systems of automobiles, other consumer appliances, and the like. More particularly the present invention relates to an acceleration sensor having a self-diagnosis function.

2. Description of the Related Art

In recent years, an airbag system has been installed in an automobile as a standard to improve safety. One of the important devices in the airbag system is an acceleration sensor which detects a shock (acceleration) The acceleration sensor is required to have high reliability, and thus it usually has a self-diagnosis function.

FIG. 4 shows a configuration of a conventional semiconductor acceleration sensor. As shown in the figure, the acceleration sensor usually comprises a sensor chip 110 for detecting acceleration and an ASIC (application-specific integrated circuit) 120 for signal processing such as converting, filtering and amplifying a signal for the sensor chip 110. In the acceleration sensor, a movable electrode (mass body) 113 placed between fixed electrodes 111a and 111b is displaced upon receiving the acceleration, the displacement of the movable electrode 113 causes changes in capacitance between the fixed electrodes 111a, 111b and the movable electrode 113. The acceleration sensor detects the acceleration by converting the changes in capacitance into an electric signal to detect the electric signal.

The capacitance changes detected by the sensor chip 110 are converted into a voltage signal by a capacitance-to-voltage conversion circuit 121 in ASIC 120. The voltage signal is fed to a gain adjustment circuit 125 through a low-pass filter (LPF) 123. The gain of the signal voltage is adjusted in the gain adjustment circuit 125, and a sensor output is obtained after the voltage signal is amplified in an amplifier circuit 127. To the gain adjustment circuit 125, the gain is adjusted by using data 133 for gain adjustment. Also, an offset adjustment circuit 129 adjusts the offset value of the amplifier circuit 127 by using data 135 for offset adjustment.

An acceleration sensor usually has a self-diagnosis function. An electrode 115 is provided opposite to the movable electrode 113 in the acceleration sensor for the self-diagnosis. During self-diagnosis operation, a predetermined voltage is applied to the electrode 115 from the signal processing ASIC 120 such that the movable electrode 113 is then displaced by the attractive static force as if an acceleration is generated. The acceleration sensor detects an abnormality by measuring the changes in the capacitance caused by the displacement.

In order to detect an abnormality with high precision during self-diagnosis operation, the deviation in the sensor output during self-diagnosis operation should be more than a predetermined level. For that purpose, increasing the length of the electrode 115 for self-diagnosis in the sensor chip, or decreasing the distance between the electrodes 113 and 115 may be considered. However, modification of the sensor chip configuration is difficult owing to the limitation of the package size, so that such a method is limited in some degree.

Therefore, a method may also be considered to increase the voltage applied to the self-diagnosis electrode 115 by a voltage-booster circuit 131 provided in ASIC 120. By the booster circuit 131, the source voltage is raised to a predetermined voltage so that a sufficient level of the sensor output for self-diagnosis can be obtained, and then applied to the electrode 115. However, when a voltage beyond the source voltage of the ASIC 120 is required for applying to the electrode 115 for self-diagnosis, the temperature characteristic in the output voltage of the booster circuit 131 become problematic, and thus this method is not sufficient.

SUMMARY OF THE INVENTION

The object of the present invention is to solve the above problem and to provide an acceleration sensor which can improve precision of the self-diagnosis.

The present invention provides an acceleration sensor which is provided on a semiconductor sensor chip and detects acceleration based on changes in capacitance between a movable electrode and fixed electrodes. The acceleration sensor includes a self-diagnosis electrode which is composed by a semiconductor chip, and an amplifier for amplifying a detection signal obtained by converting changes in capacitance between the self-diagnosis electrode and the movable electrodes into a electric signal, the signal amplified by the amplifier being output as a self-diagnosis signal. The amplification factor of the amplifier during self-diagnosis operation is made greater than the factor during non-self-diagnosis The acceleration sensor may further include a section for modifying offset drift in the amplified signal obtained by the amplifier during self-diagnosis operation.

In the acceleration sensor, the amplifier may include an operational amplifier, two resistors which are connected to the operational amplifier to provide a feedback loop, and a switch, and one of the two resistors is connected to the operational amplifier through the switch so that the one of the two resistors can be disconnected.

According to the acceleration sensor of the present invention, a self-diagnosis signal of a predetermined level can be obtained without a voltage booster circuit in the integrated circuit that performs predetermined signal processing by increasing the amplification factor of the amplifier circuit during self-diagnosis operation.

Further, by installing a means for modifying offset drift during self-diagnosis operation in the acceleration sensor, more precise results of self-diagnosis are obtained.

Further, by switching the feedback connection of the two resistors to the operational amplifier, the amplification factors are easily switched between a self-diagnosis operation and a non-self-diagnosis operation.

BRIEF DESCRIPTION OF THE DRAWINGS

Other objects and attainments together with a fuller understanding of the invention will become apparent and appreciated by referring to the following description and claims taken in conjunction with the accompanying drawings, in which like parts are designated by like reference numerals and in which:

DESCRIPTION OF THE PREFERRED EMBODIMENTS

In the following are described some embodiments of the present invention with reference to the attached drawings.
First Embodiment.

Figure 1:
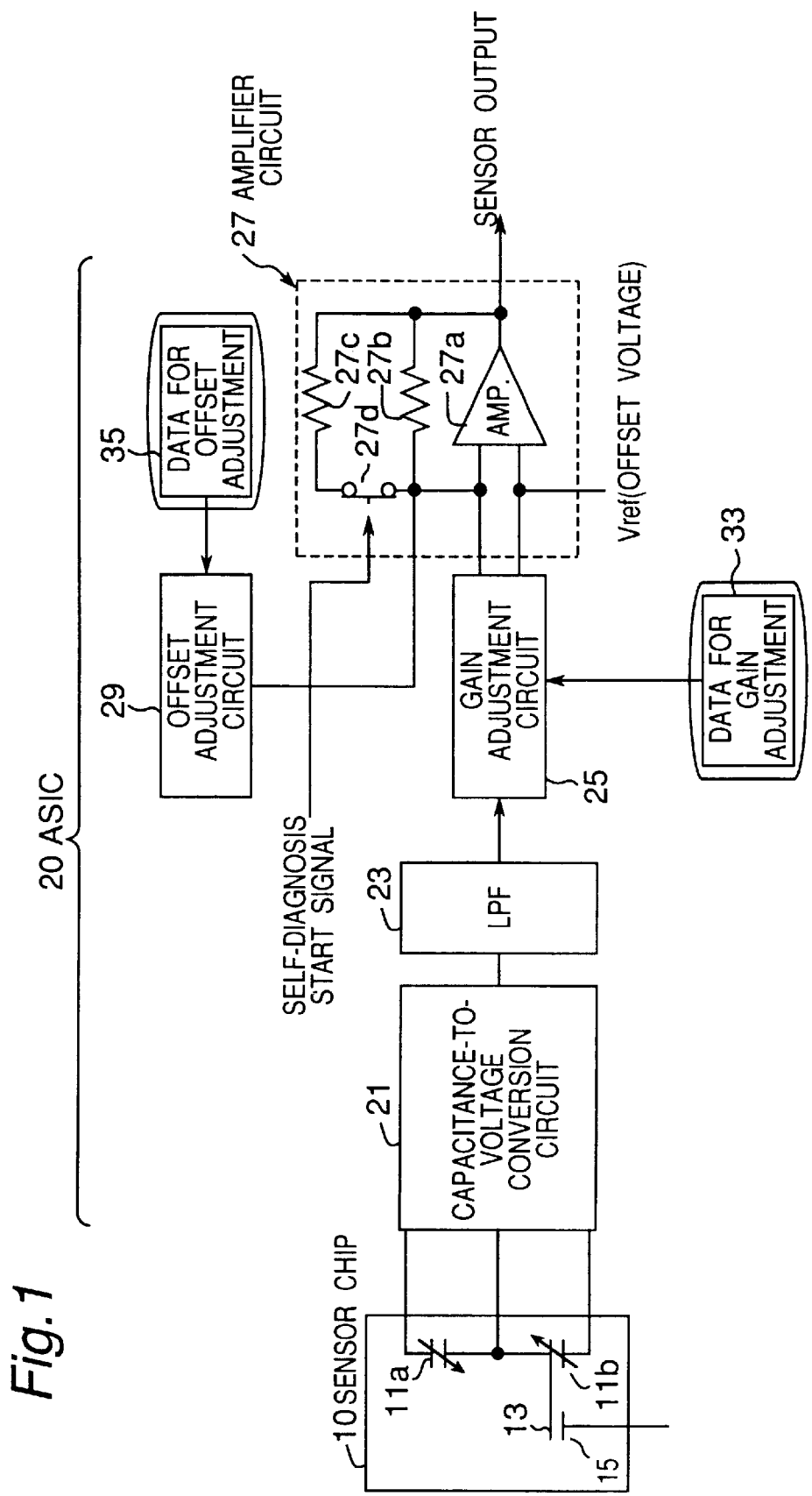
FIG. 1 is a block diagram of a semiconductor acceleration sensor in accordance with a first embodiment of the present invention.

FIG. 1 shows a block diagram of an acceleration sensor in accordance with a first embodiment of the present invention. As shown in the figure, the acceleration sensor comprises a sensor chip 10 for detecting acceleration and ASIC 20 for signal processing including converting, filtering and amplifying a signal from the sensor chip 10.

The sensor chip 10 is provided with fixed electrodes 11a and 11b, a movable electrode 13, and an electrode 15 for self-diagnosis. An acceleration displaces the movable electrode 13 which is provided between the fixed electrodes 11a and 11b to cause changes in capacitance between the fixed electrodes 11a, 11b and the movable electrode 13. The acceleration sensor then detects the acceleration by converting the capacitance changes into an electric signal and then detecting the signal. The electrode 15 for self-diagnosis is provided opposite to the movable electrode 13. During self-diagnosis operation, a predetermined voltage is applied to the electrode 15 for self-diagnosis. The acceleration sensor detects an abnormality by converting changes in the capacitance occurring between the electrode 15 for self-diagnosis and the movable electrode 13 into an electric signal.

ASIC 20 comprises a capacitance-to-voltage conversion circuit 21 which converts the capacitance changes detected by the sensor chip 10 into voltage changes, a low-pass filter (LPF) 23 which passes only low frequency components of a detection signal from the capacitance-to-voltage conversion circuit 21, a gain adjustment circuit 25 which adjusts a gain of the sensor output, and an amplifier circuit 27 which receives the detection signal through the gain adjustment circuit 25 to amplify the received signal.

A gain of the gain adjustment circuit 25 is adjusted by using data 33 for gain adjustment. The offset of the amplifier circuit 27 is adjusted by an offset adjustment circuit 29 using data 35 for offset adjustment for adjusting the offset of the amplifier circuit 27 during ordinary detection. The data 33 for gain adjustment and the data 35 for offset adjustment are stored in ROM or the like.

The amplifier circuit 27 comprises an operational amplifier 27a, resistors 27b and 27c, and a switch 27d. The resistors 27b and 27c are connected to the operational amplifier 27a in parallel to apply feedback. In particular, the resistor 27c is connected to the operational amplifier 27a through the switch 27d.

When the switch 27d is turned off, the resistor 27c is electrically disconnected from the operational amplifier 27a. Then, the value of the feedback resistance becomes greater, so that the amplification factor is set at a large value. When the switch 27d is turned on, the resistor 27c is electrically connected to the operational amplifier 27a. Then, the value of the feedback resistance becomes lower, so that the amplification factor is set at a small value. In this way, the resistors 27b, 27c and the switch 27d compose a means for varying the amplification factor of the amplifier circuit 27.

A reference voltage $V_{ref}$ (equivalent to the offset voltage of the operational amplifier 27a) is applied to one input terminal of the operational amplifier 27a. The output from the gain adjustment circuit 25 is applied to the other input terminal of the operational amplifier 27a. Further, the other input terminal is also connected to the offset adjustment circuit 29, and the voltage for adjusting the drift of the offset voltage is fed to the other input terminal.

In the semiconductor sensor constructed as above, a self-diagnosis start signal is set to active when the self-diagnosis is performed. When a self-diagnosis is not performed, the self-diagnosis start signal is set to inactive, and the switch 27d is on. On the other hand, when a self-diagnosis is performed, the self-diagnosis start signal is set to active, and the switch 27d is off. Thus, the amplification factor of the amplifier circuit 27 is set at a small value during non-self-diagnosis operation, while the amplification factor of the amplifier circuit 27 is set at a large value during self-diagnosis operation.

In this way, by increasing the amplification factor of the amplifier circuit 27 during self-diagnosis operation more than the amplification factor during non-self-diagnosis operation (ordinary operation for acceleration detection), a predetermined level of the sensor output can be obtained. Therefore, a voltage-booster circuit for generating a voltage to be applied to the movable electrode 15 during self-diagnosis operation is not required in ASIC 20.
Second Embodiment.

Figure 2:
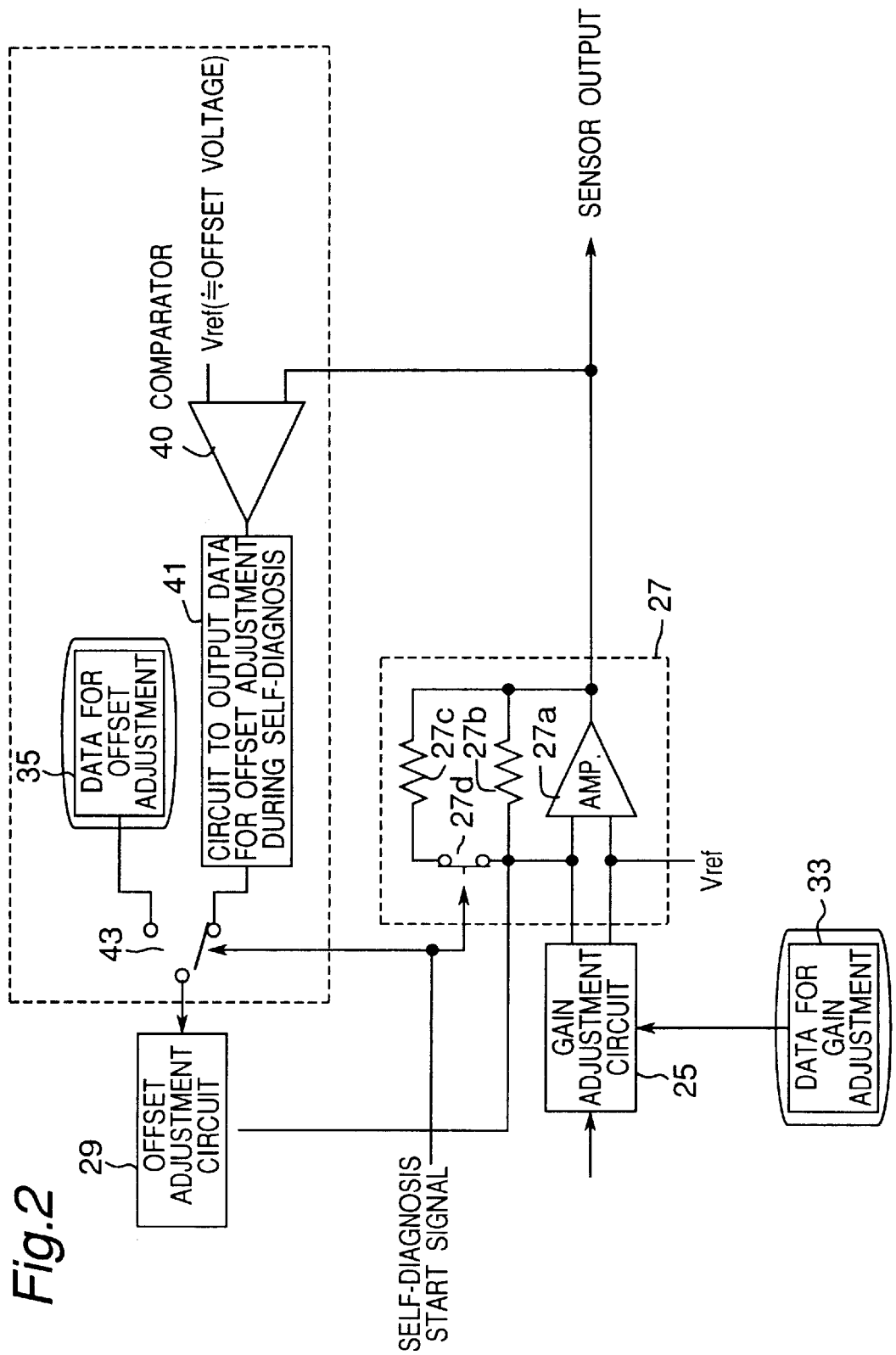
FIG. 2 is a block diagram of a semiconductor acceleration sensor in accordance with a second embodiment of the present invention.

In the acceleration sensor described in the first embodiment, the amplification factor of the amplifier circuit 27 during self-diagnosis operation is made greater than that during non-self-diagnosis operation. However, when the amplification factor becomes greater, the offset existing on the input of the amplifier circuit 27 is amplified at the greater factor, so that the offset voltage of the sensor output drifts by a large amount. In this case, a result of self-diagnosis may be inaccurately detected. Therefore, in this second embodiment, means for adjusting the offset voltage during self-diagnosis operation is newly provided to the configuration of the acceleration sensor of the first embodiment. FIG. 2 shows that configuration.

As shown in FIG. 2, the acceleration sensor of the second embodiment has a circuit 41 to output data for offset adjustment during self-diagnosis operation, a comparator 40, and a switch 43, as means for adjusting the offset voltage during self-diagnosis operation. One of the data 35 for offset adjustment and the output from the output circuit 41 is selected and fed to the offset adjustment circuit 29 through the switch 43. The offset adjustment circuit 29 outputs a voltage for adjusting the offset of the amplifier circuit 27 by using either one of the data 35 for offset adjustment and the data output from the output circuit 41.

The operation of the switch 43 is controlled by the self-diagnosis start signal. The switch 43 connects the data 35 for offset adjustment to the offset adjustment circuit 29 when the self-diagnosis start signal is inactive. The switch 43 connects the output circuit 41 to the offset adjustment circuit 29 when the self-diagnosis start signal is active.

The comparator 40 compares the reference voltage ($V_{ref}$) with the sensor output to output the comparison result to the output circuit 41. The output circuit 41 provides the offset adjustment circuit 29 with data for adjusting the drift of the offset caused by increase of the amplification factor during self-diagnosis operation. At this time, the output circuit 41 varies the value of the data for offset adjustment during self-diagnosis operation according to the output from the comparator 40 to output the data.

Figure 3:
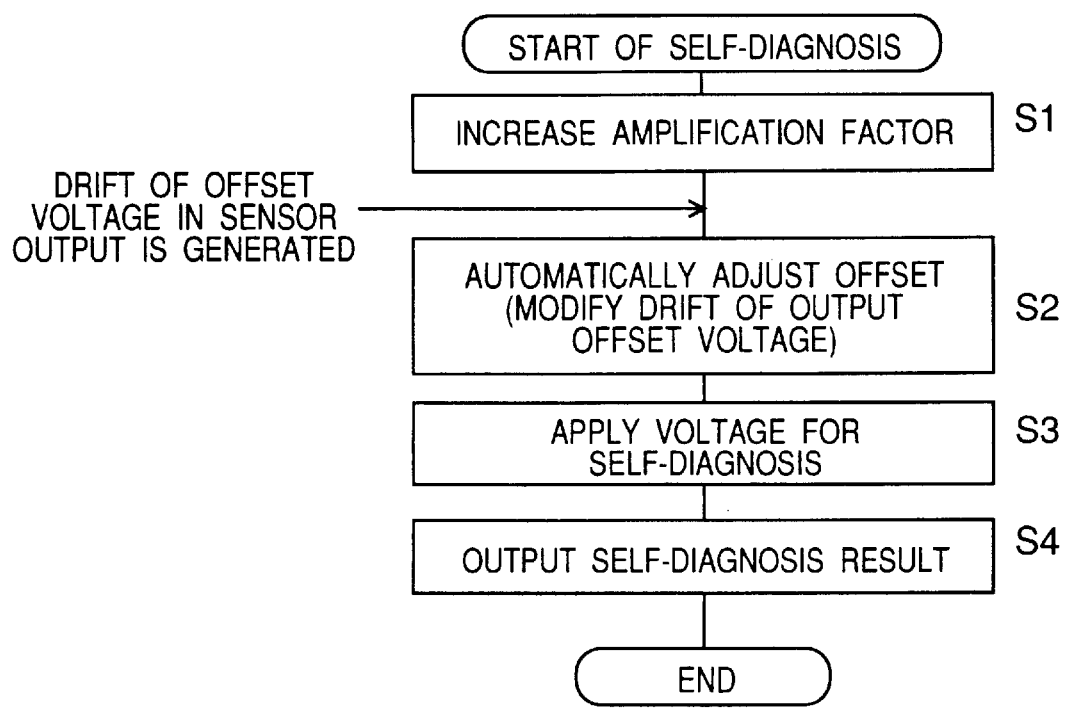
FIG. 3 is a flowchart that illustrates processing during self-diagnosis in the semiconductor acceleration sensor in accordance with the second embodiment.
Figure 4:
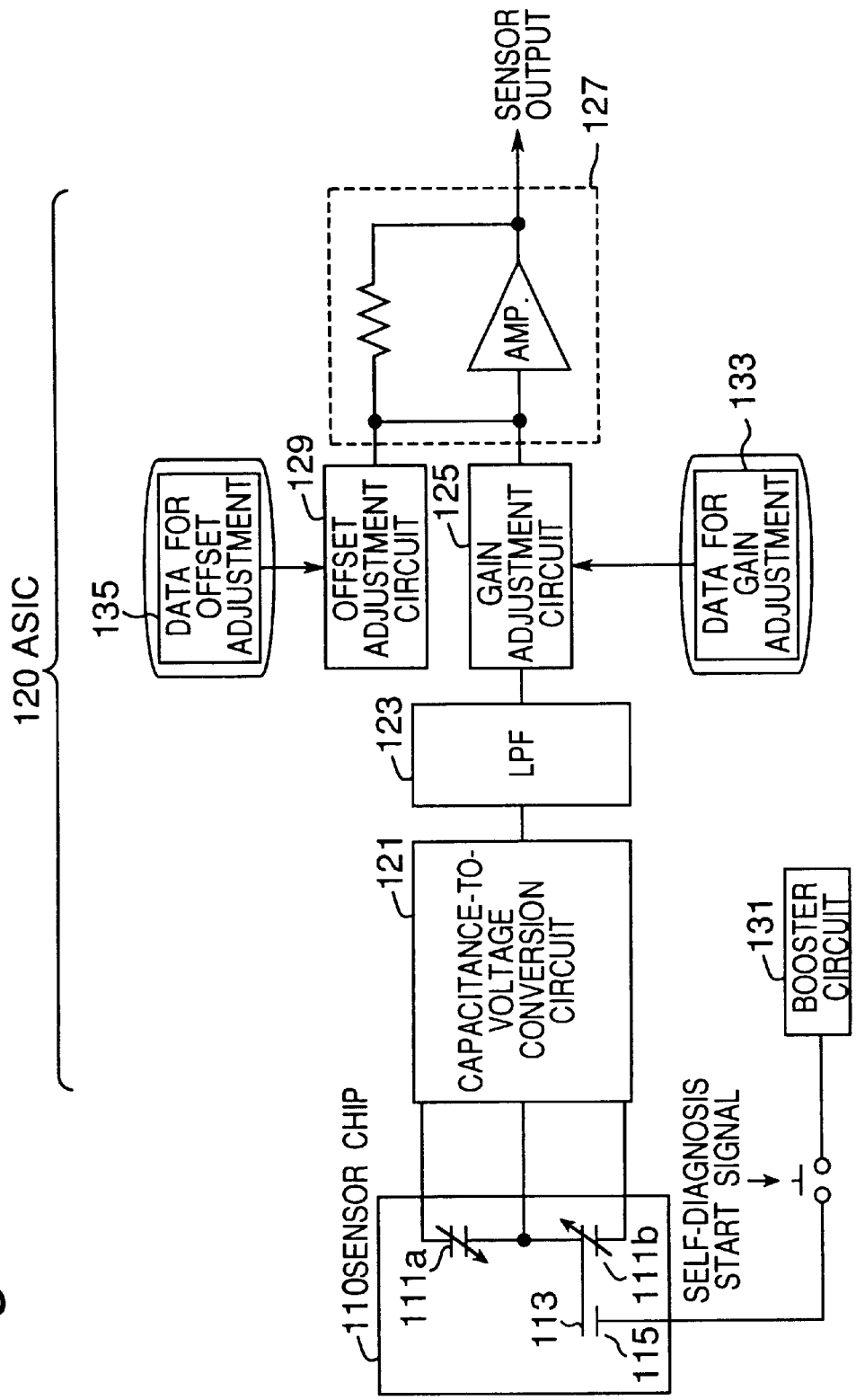
FIG. 4 is a block diagram of a prior semiconductor acceleration sensor.

In the following is described the processing flow in the acceleration sensor of the present embodiment during self-diagnosis operation with reference to FIG. 3.

(Step S1) When self-diagnosis is performed, the self-diagnosis start signal is made active. On receiving the self-diagnosis starting signal, the amplification factor of the amplifier circuit 27 is raised. At the same time, a source of the adjustment data to be input to the offset adjustment circuit 29 is set to the output circuit 41.

(Step S2) In order to modify the offset drift of the sensor output caused by increase in the amplification factor of the amplifier circuit 27, the comparator 40 successively compares the sensor output with the reference voltage ($V_{ref}$) Depending on the comparison results, the output circuit 41 adjusts the value of the output data such that the sensor output becomes equivalent to offset voltage at ordinary operation. In this way, the offset voltage is automatically adjusted to a predetermined value.

(Step S3) After the offset voltage is adjusted to the predetermined value, the voltage for self-diagnosis is applied to the self-diagnosis electrode 15.

(Step S4) Change amounts of the sensor output are measured, and the result of self-diagnosis is released.

As described above, in the acceleration sensor of the present embodiment, offset adjustment is performed using the data 35 for offset adjustment during normal operation in which self-diagnosis is not performed, while offset adjustment is performed using data from the output circuit 41 during self-diagnosis. In this way, by switching data for offset adjustment between at the self-diagnosis operation and at the non-self-diagnosis operation, offset drift due to changes in the amplification factor can be adjusted, and therefore self-diagnosis can be performed with high precision.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. An acceleration sensor for detecting acceleration based on changes in capacitance between a movable electrode and fixed electrodes provided on a semiconductor sensor chip, the acceleration sensor comprising:

a self-diagnosis electrode provided on the semiconductor chip;

an amplifier configured to amplify a detection signal obtained by converting changes in capacitance between the self-diagnosis electrode and the movable electrode into an electric signal, the signal amplified by the amplifier being output as a self-diagnosis signal; and a device configured to increase the amplification factor of the amplifier during self-diagnosis operation to a value greater than an amplification factor during non-self-diagnosis operation.

2. The acceleration sensor according to claim 1 further comprising a section for modifying offset drift in the amplified signal obtained by the amplifier during self-diagnosis operation.

3. The acceleration sensor according to claim 1, wherein the amplifier comprises an operational amplifier and said device comprises two resistors connected to the operational amplifier to provide a feedback loop, and a switch, one of the two resistors being connected to the operational amplifier through the switch so that the one of the two resistors can be disconnected.

* * * * *